Nov. 28, 1950 P. KAELIN 2,531,883

SUBSTATION CIRCUIT WITH LOUDSPEAKER

Filed April 16, 1949 2 Sheets-Sheet 1

Inventor
Pierre Kaelin
By Robert E. Burns
Attorney

Nov. 28, 1950 P. KAELIN 2,531,883

SUBSTATION CIRCUIT WITH LOUDSPEAKER

Filed April 16, 1949 2 Sheets-Sheet 2

Inventor
Pierre Kaelin
By Robert E. Burns
Attorney

Patented Nov. 28, 1950

2,531,883

UNITED STATES PATENT OFFICE 2,531,883

SUBSTATION CIRCUIT WITH LOUDSPEAKER

Pierre Kaelin, Lausanne, Switzerland

Application April 16, 1949, Serial No. 87,959
In Switzerland April 21, 1948

1 Claim. (Cl. 179—81)

The invention relates to a station of a telephone system connected to a channel for the transmission of sound signal currents.

It is an object of the invention to provide such a station comprising two electro-acoustic circuits, whereby upon transmission of sound to one of these circuits, the resulting current variations in this circuit are not transmitted to the other of said circuits.

A further object of the invention is to provide a telephone station comprising a microphone and a loud speaker circuit, whereby upon operation of the microphone circuit no sound current variations are transmitted to the loud speaker circuit, and upon operation of the loud speaker circuit no sound current variations are transmitted to the microphone circuit. In accordance with the present invention, a station for a telephone system including a microphonic circuit and a loud speaker circuit of which at least one is provided with an amplifier, is characterized by the fact that it is connected in such manner that the amplifier of the loud speaker circuit is not subjected to any variation of current intensity when the microphonic circuit is in operation, so that the latter does not act upon the loud speaker circuit.

Other objects and advantages of the invention will be apparent during the course of the following description and claims in conjunction with the accompanying drawings, which illustrate by way of example several embodiments of a station of a telephone system according to the invention.

In these drawings, in which like reference marks are employed to designate like parts throughout the same, Figure 1 represents the assembling of a Wheatstone bridge, with the intention to facilitate the understanding of the principle on which the invention is based;

Throughout the figures, members not necessary for the understanding of the principle of the invention have been omitted for reasons of clearness.

In the Figures 2 through 8, the transmission channel is designated by the telephone line *a, b* connected to the coupling device C, which comprises the usual condensers, relays, etc., and couples the line to the central exchange.

Figures 2, 3:
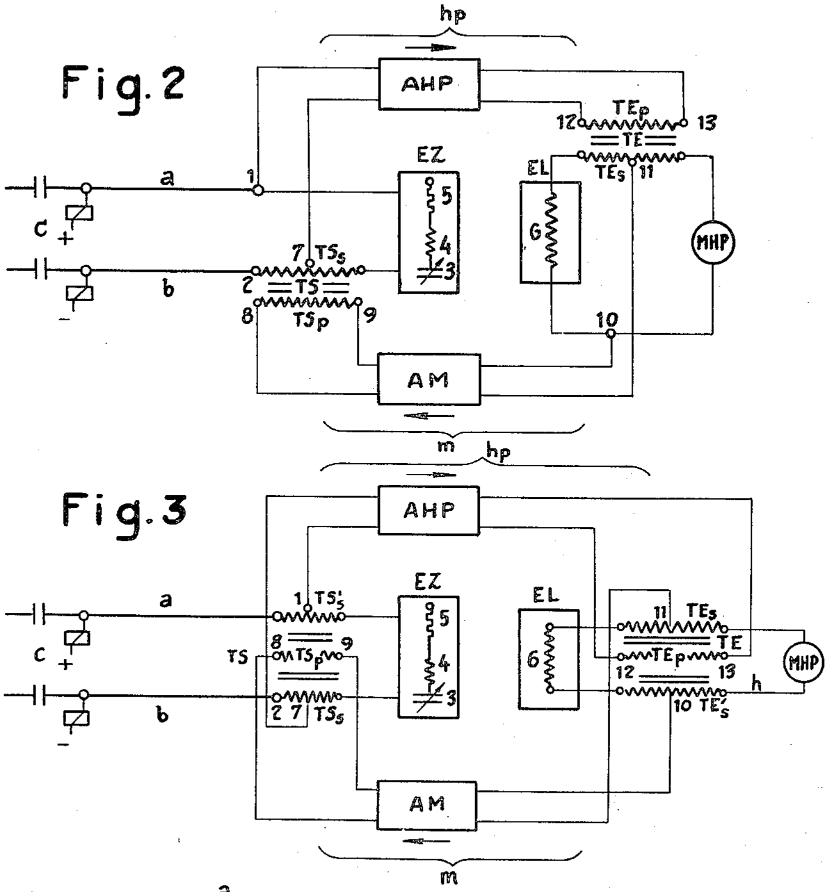
Figure 2 is a diagram of a station of a telephone system showing an embodiment of the invention.
Figure 3 shows a modification of the embodiment of Figure 2.

The station shown in Fig. 2 comprises a loud speaker circuit *hp*, a microphone circuit *m*, an amplifying apparatus AHP, called input amplifier for the loud speaker circuit, and an amplifying apparatus AM called output amplifier for the microphone circuit. The microphone and the loud speaker form a single transducer MHP common to both circuits. Furthermore, the station includes two transformers designated by TE and TS (input transformer and output transformer). Two balancing devices are provided, the purpose of which is to avoid the action of the loud speaker circuit on the mircrophone circuit and reciprocally; this action is undesirable as it would produce whistling sounds or an echo in the loud speaker or would return the communications received into the transmission channel. One of these balancing devices, designated by EZ, constitutes an impedance to be called $Z_1$ which is to balance the impedance to be called $Z_2$ of the outgoing channel, i. e., the line *a, b* and the device C. The other balancing device designated by EL constitutes a self-induction of a value $L_1$ intended to balance the self-induction to be called $L_2$ of the apparatus MHP. The device EZ with impedance $Z_1$, may comprise a condenser 3, a self-induction coil 4 and a resistance 5. These members, for instance, mounted in series, have a variable action so as to permit the coupling of the station to channels of varied impedance $Z_2$ or to permit the compensating of the variations of impedance which could occur in the channel. The members of the device EZ may also be assembled otherwise than in series. The device EL, with impedance $L_1$, includes a self-induction coil 6.

The balancing device EZ is connected in series with the secondary winding $TS_s$ of the output transformer TS across terminals of the line *a, b* at the points 1, 2. The primary winding $TS_p$ of this transformer TS is connected to the output leads of the amplifier AM. The input leads of the amplifier AHP are connected at point 1 to the terminal of the line *a* and to the middle 7 of the transformer winding $TS_s$, respectively. The output leads of the amplifier AHP are connected across the primary winding $TE_p$ of the input transformer TE, the secondary winding $TE_s$ lying in circuit with the transducer MHP and the balancing device EL. The input leads of the amplifier AM are connected to the middle 11 of the secondary transformer winding $TE_s$ and to point 10 on the connection between the transducer MHP and the balancing device EL.

The assembling of the balancing devices is based on the application of the Wheatstone bridge principle, which principle will be briefly described with reference to Figure 1. The bridge consists of two parallel branches connected across the terminals D and E of a voltage supply source, each of the branches comprising in series two resistances (or generally impedances of any kind) $R_1$, $R_2$ and $R_3$, $R_4$, respectively. It is known that the difference of potential between points F and G lying between the resistances $R_3$ and $R_4$ in one branch and the resistances $R_1$ and $R_2$ in the other is nil irrespective of the potential across the terminals D, E, provided that the resistances answer the equation $$\frac{R_1}{R_2}=\frac{R_3}{R_4}$$

Figure 1:
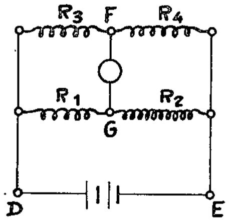

Applying this principle to Figure 2, it will be noted that a Wheatstone bridge is formed by the impedance $Z_2$ of the channel *a*, *b*, C and the impedance $Z_1$ of the balancing device EZ forming one branch and the two halves of the secondary transformer winding $TS_s$ forming the other branch, and the terminals 8, 9 of the transformer $TS_p$ corresponding with the terminals D, E of Figure 1. Therefore, no difference of potential will exist between the points 1 and 7 when an alternating current is fed through winding $TS_p$, if $$\frac{Z_1}{Z_2}=\frac{TS_{s/2}}{TS_{s/2}}$$

or $Z_1=Z_2$, in which $TS_{s/2}$ designates the impedance of one-half of the transformer winding $TS_s$. It follows that in this case, upon operation of the microphone circuit *m*, the resulting sound current variations, amplified by the amplifier AM, reach the terminals 8, 9 of the primary transformer winding $TS_p$ and are transmitted to the line *a*, *b* without influencing the amplifier AHP connected to the points 1 and 7. The loud speaker circuit is thus made independent of the microphone circuit.

In a like way, a Wheatstone bridge is formed by the self-inductions $L_1$ of the balancing device EL and the self-induction $L_2$ of the transducer MHP forming one branch, and the two halves of the secondary transformer winding $TE_s$ forming the other branch. Again no difference of potential will exist between points 10 and 11 when an alternating current is fed through the primary transformer winding $TE_p$ if $$\frac{L_1}{L_2}=\frac{TE_{s/2}}{TE_{s/2}}$$

or $L_1=L_2$, in which $TE_{s/2}$ stands for the impedance of one-half of the transformer winding $TE_s$. Therefore, when the station receives a signal current from the channel, the current variations amplified by the amplifier AHP reach the terminals 12, 13 of the primary transformer winding $TE_p$ and are transmitted to the inducer MHP operating as a loud speaker, without influencing the output amplifier AM connected to the points 10, 11. Thus the communications received are not sent back into the line.

Of course the loud speaker and the microphone can consist of two distinct apparatuses. The station may furthermore include an ordinary micro-telephone placed under the action of a switch, making it possible to connect the loud speaker and the micro-telephone separately.

The modification of Figure 3 differs from the embodiment of Figure 2 only through the addition of a second secondary winding to the transformers TE and TS. The new secondary winding of the transformer TE, designated by $TE_s'$ is placed in the line which connects the apparatus MHP with the balancing device EL. The line connected to terminal 10, which leads to the amplifier AM, is branched at the center of the winding $TE_s'$ so that the following relation exists:

$$\frac{L_1+TE'_{s/2}}{L_2+TE'_{s/2}}=\frac{TE_{s/2}}{TE_{s/2}}$$

and the operation of the station as previously described remains unchanged. The same applies to the new secondary winding of the transformer TS, which is designated by $TS_s'$ and which is connected to the line *a*, at the place where it enters the station. The line connected to terminal 1, which leads to the amplifier AHP, is branched at the middle of the winding $TS_s'$ so that again the following relation exists:

$$\frac{Z_1+TS'_{s/2}}{Z_2+TS'_{s/2}}=\frac{TS_{s/2}}{TS_{s/2}}$$

and the operation of the station is as described previously.

Figure 4:
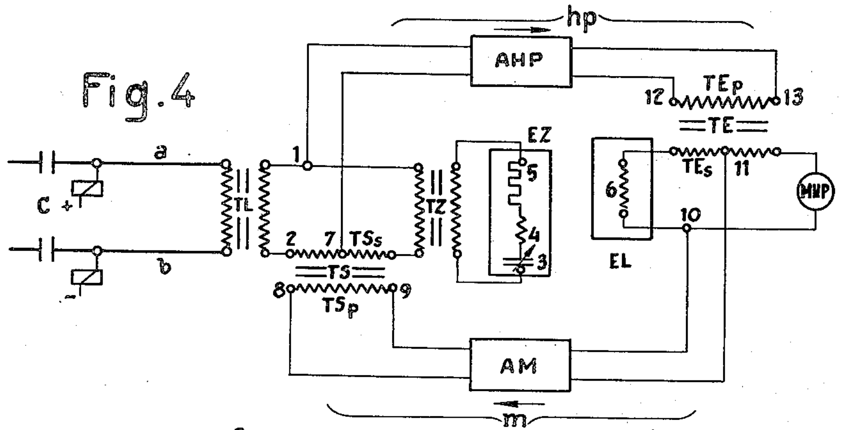
Figure 4 shows another modification of the embodiment of Figure 2.

The modification shown in Figure 4 is identical with the embodiment of Figure 2, except that in order to insulate the station from the line *a*, *b*, an additional coupling transformer designated by TL is mounted on the line *a*, *b* at the place where the line enters the station. A second coupling transformer identical to TL is arranged across the balancing device EZ. This transformer designated by TZ serves to balance the transformer TL.

Figure 5:
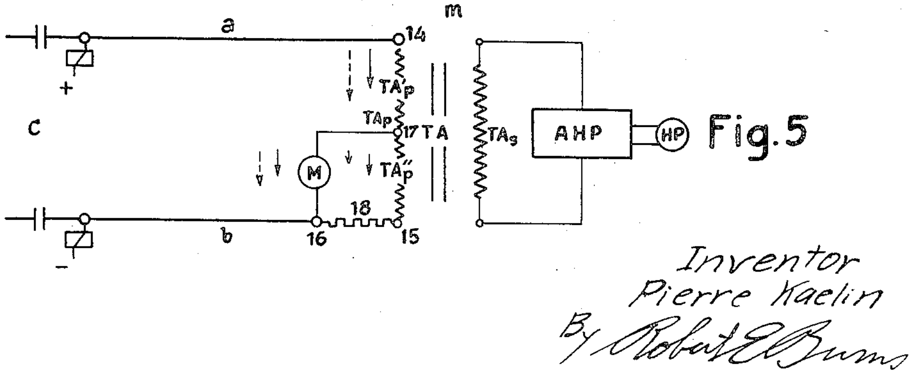
Figure 5 is a diagram of a telephone station showing another embodiment of the invention.

Figure 5 shows a simplified assembly intended to prevent the action of the microphone on the loud speaker. The telephone line *a*, *b* is connected with terminal 14 and 15 located at the ends of the primary winding $TA_p$ of an input transformer TA. The loud speaker designated by HP and its amplifier AMP are connected with the secondary winding $TA_s$ of this transformer. There is no amplifier for the microphone designated by M. The two terminals of this microphone designated by 16 and 17 are located, one, namely 16, on the line *b*, and the other, namely 17, at a point of the winding TA which is thus divided into two portions $TA_p'$ and $TA_p''$. A resistance 18, or an impedance in general, is connected between the terminals 15 and 16. The microphone M and the winding $TA_p''$ are mounted in parallel. Now it is known that when two resistances are mounted in parallel, the total intensity of the current traversing same is proportional to the sum of their reciprocals. If, therefore, a sound impression reaches the microphone and if the resistance of the latter decreases, the total intensity of the current passing through the microphone and through the resistance $TA_p''$ increases although the intensity of the current passing through the resistance $TA_p''$ decreases. This total intensity having thus increased, the intensity of the current which passes through the resistance $TA_p'$ must also have increased. It suffices that the position of the terminal 17 along the winding $TA_p$ be wisely selected for the current induced in the winding $TA_s$ not to be affected by the variations of resistance of the microphone, the variations of intensity in the winding $TA_p''$ being compensated by the operating variations of intensity in the winding $TA_p'$. The arrows, the length of which symbolizes the intensity of the current, illustrate this phenomenon. The arrows in full lines show the intensity of the current when the microphone is at rest and the arrows in dotted lines show an example of intensity of the current when the microphone operates and its resistance decreases. The resistance 18 arranged between the terminals 15 and 16 prevents the current from too easily passing through the winding $TA_p''$ and compels it also to pass through the microphone M.

Figure 6:
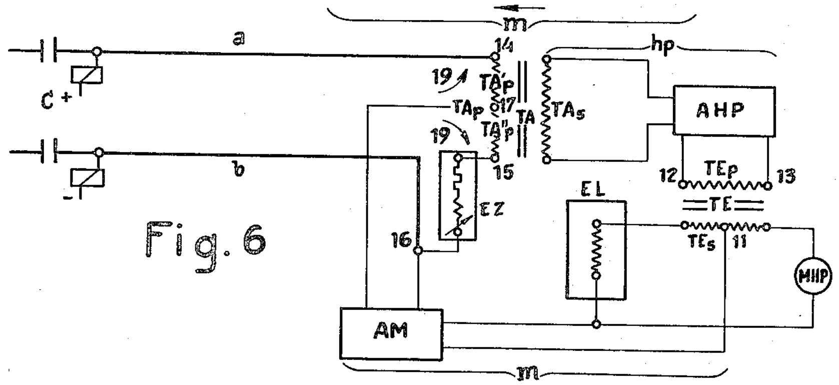
Figure 6 is a diagram showing yet another embodiment of the invention.

The embodiment of the invention shown in the diagram of Figure 6 is derived from those of Figures 2 and 5. The station has a transducer MHP which, in combination with the balancing device EL and the input transformer TE, is connected to the input amplifier AHP of the loud speaker circuit *hp* and the output amplifier AM of the microphone circuit *m* in exactly the same way as shown in Figure 2 so that, as has already been described, an incoming communication amplified by amplifier AHP does not influence the output amplifier AM.

Across the terminals of the line *a*, *b*, there again is mounted a transformer $DA_p$ of a transformer TA in series with a balancing device EZ balancing the channel. However, in this case the middle 17 of the transformer winding $TA_p$ and the terminal 16 of the balancing device EZ are not connected to the input leads of the input amplifier AHP as was the case in Figure 2, but to the output leads of the output transformer AM of the microphone circuit, corresponding to the diagram of Figure 5. Consequently the terminals of the transformer winding $TA_s$ are connected to the input leads of the amplifier AHP. Upon operation of the microphone circuit *m*, the amplified current is divided at the point 17 into two equal and opposite components flowing in the directions of the arrows 19 through the winding halves $TA_p'$ and $TA_p''$, respectively, of the winding $TA_p$, so that no voltage is induced in the winding $TA_s$ and the amplifier AHP is not excited. This part of the diagram, however, may, just as the diagram of Figure 5, also be considered as forming a Wheatstone bridge, in this case the balancing device EZ and the winding half $TA_p''$ forming one branch and the impedance of the channel and the winding half $TA_p'$ forming the other branch, the terminals 14 and 15 of the transformer TA corresponding to the points F and G of Figure 1. From this it also follows that no voltage is induced in the winding $TA_s$ by the winding $TA_p$.

Figure 7:
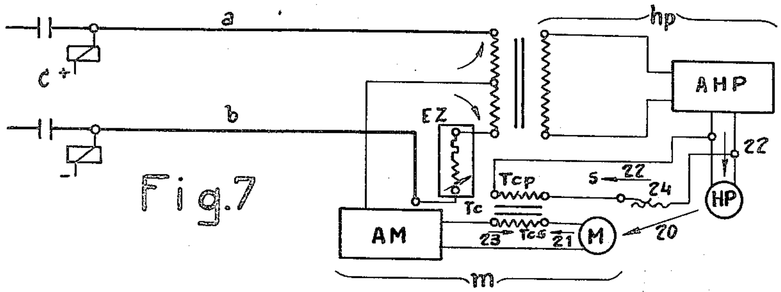
Figure 7 is a diagram showing still another embodiment of the invention.
Figure 8:
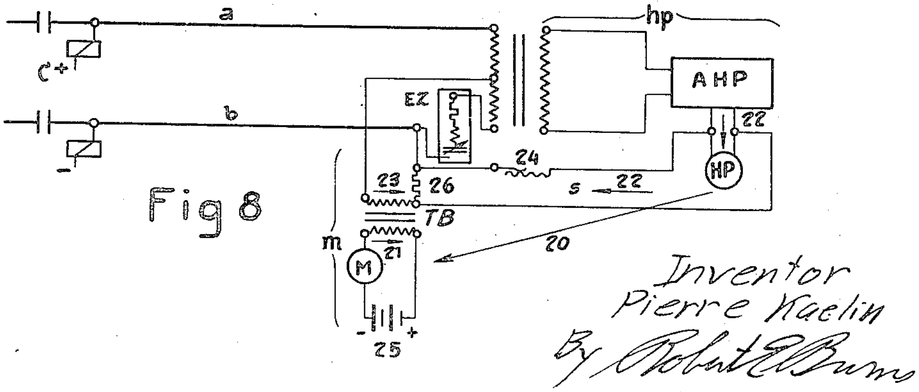
Figure 8 shows a modification of the embodiment of Figure 7.

In the diagrams of Figures 2, 3, 4 and 6, the loud speaker and microphone being constituted by a single transducer, there cannot be any direct acoustic action of the loud speaker on the microphone. If these two apparatuses are distinct, however, this unwanted acoustic action may occur. Figures 7 and 8 show diagrams of assembling intended to overcome this drawback.

The diagram of Figure 7 is derived from that of Figure 6 with the difference that, as a microphone M and a loud speaker HP are separately mounted, their respective circuits *m* and *hp* are no longer electrically coupled as before. The transformer TE of Figure 6 is therefore omitted together with the balancing device EL, the loudspeaker HP and the microphone M being directly connected to the amplifiers AHP and AM, respectively. An additional circuit *s* is mounted in parallel with the loud speaker HP. This circuit includes a variable resistance 24 and an induction coil $TC_p$ which constitutes the primary winding of a compensation transformer TC, the secondary winding of which designated by $TC_s$ is mounted in series with the microphone.

The operation of this compensating device is as follows:

The sounds emitted by the loud speaker strike the microphone along the arrow 20 which produces in the circuit *m* variations of current intensity symbolically represented by the arrow 21. Simultaneously the variations of current intensity which cause the loud speaker to operate and which are represented by the arrows 22 are also fed into the circuit *s* and in the winding $TC_p$, which induces in the winding $TC_s$ voltage variations represented by the arrow 23. The variable resistance 24 mounted on the circuit *s* makes it possible to regulate the value of the occurring current variations in this circuit in such a manner that the voltage variations in the winding $TC_s$ of the circuit *m*, due to the operation of the microphone and those induced in same by the transformer winding $TC_p$, are equal and opposed, so that no acoustic action of the loudspeaker HP on the microphone M can influence the amplifier AM. In the assembly it is necessary to take the polarity of the windings of transformer TC into account in order for these variations to be of opposite direction.

The diagram of Figure 8 is similar to that of Figure 7, except that the microphone circuit *m* does not include an amplifier but a voltage supply source 25 mounted in series with the microphone M and the primary winding of an output transformer TB, while the compensation circuit *s* acts on a resistance 26 mounted in the output circuit of this transformer TB. The voltage variations across the resistance 26 caused by the current variations in the circuit *s* again oppose those resulting from the acoustic action 20 of the loud speaker HP on the microphone *m* and transmitted through the transformer TB.

What I claim and desire to secure by Letters Patent is:

A station of a telephone system connected to a channel for transmitting sound signal currents, said station comprising an electro-acoustic circuit and a loud speaker circuit, a transducer common to both circuits, a transformer, a balancing device having the same impedance as the outgoing transmission channel and connected in series with one of the windings of said transformer across the terminals of said transmission channel, an output amplifier in said electric-acoustic circuit with its output terminals connected across said balancing device and across half of said transformer winding lying in series with said balancing device, an input amplifier in said loud speaker circuit with its input terminals connected across the other winding of said transformer, a second transformer, one side of which is connected to the output terminals of said loud speaker input amplifier, a second balancing device having the same impedance as said transducer and connected in series with the other winding of said second transformer across said transducer, the input terminals of said output amplifier being connected across said second balancing device and across half of the winding of said second transformer lying in series with said second balancing device.

PIERRE KAELIN.

REFERENCES CITED

The following references are of record in the file of this patent:

UNITED STATES PATENTS

| Number | Name | Date |
|---|---|---|
| 1,973,504 | Pierrot | Sept. 11, 1934 |
| 2,129,990 | DeFremery | Sept. 19, 1936 |
| 2,165,781 | Brandt | July 11, 1939 |